June 23, 1970   YOZO NAKAMURA ET AL   3,516,805
ELECTRODES FOR ELECTRIC RESISTANCE WELDING AND METHOD
OF MANUFACTURE THEREOF
Filed Jan. 27, 1967

INVENTORS
YOZO NAKAMURA
YOSHIHISA OZAKI

ATTORNEYS

United States Patent Office 3,516,805
Patented June 23, 1970

3,516,805
ELECTRODES FOR ELECTRIC RESISTANCE
WELDING AND METHOD OF MANUFAC-
TURE THEREOF
Yozo Nakamura, Saitamaken, and Yoshihisa Ozaki,
Tokyo, Japan, assignors to Kabushikigaisha Nakao Net-
sukagaku Kenkyusho, Souka, Saitama Prefecture, Japan
Filed Jan. 27, 1967, Ser. No. 612,144
Claims priority, application Japan, Jan. 31, 1966,
41/5,526
Int. Cl. C23c 9/00, 9/02, 13/00
U.S. Cl. 29—196.3                            8 Claims

ABSTRACT OF THE DISCLOSURE

This disclosure relates to an electrode for resistance welding consisting of a copper base metal shaped in the form of an electrode and a layer of copper-zinc alloy formed on the whole surface of the said base metal by diffusion and impregnation, or consisting of the same base metal, the same layer of alloy and a further layer of metal selected from the group consisting of aluminum, chromium, nickel, titanium, silicon and beryllium formed on the outside of the said layer of alloy by diffusion and impregnation, the said electrode being resistant to the softening by the heat conducting from the welding part, and resistant to the occurrence of mush or twist of its tip when pressed and being provided with abrasion resistance, corrosion resistance, heat resistance or the like depending upon the metal or alloy of the outside layer.

---

Figure 1:
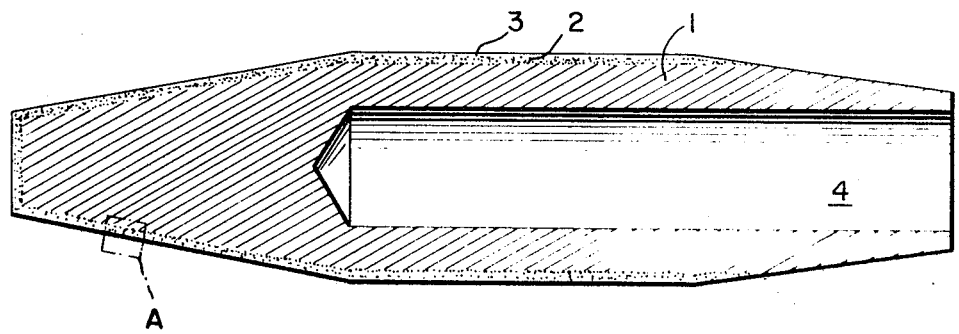

This disclosure also relates to a method for producing such an electrode which comprises maintaining a copper base metal shaped in the form of electrode in contact with a metal powder selected from the group consisting of zinc and zinc alloy or the said metal powder and another powder of a first metal selected from the group consisting of aluminum, chromium, nickel, titanium, silicon, beryllium and an alloy of iron with one of the foregoing first metals, heating the system of the said base metal and the said powder at the temperature where diffusion and impregnation of zinc occur and then at the temperature where the diffusion and impregnation of said first metal or alloy of iron occur.

This invention relates to an electrode for resistance welding, having a copper base metal and to a method for producing the same. More particularly this invention relates to an electrode for resistance welding having a copper base metal which does not soften by the thermo-conductivity from the welding part, nor does produce the mush or twist of its tip.

As well-known to those skilled in the art, resistance welding is carried out by the resistance heat generated at the welding part while causing a large quantity of electric current to flow during a short period of time through an electrode having a slender tip which is pushing a material to be welded. Hence it is necessary to select, as an electrode material, the one having a small specific resistivity and capable of rapidly dissipating the thermo-conductivity from the welding part.

electrode has been commonly made of pure copper or

For such reasons, heretofore the above-mentioned has been commonly made of pure copper or the like or a low copper alloy. However, since the copper or copper alloy has a relatively low hardness and a property liable to soften by heat, the electrode made thereof has a drawback that it softens by the heat conducting from the welding part or its tip produces mush or twist.

Further when an electrode made of pure copper or the like is used, the deformation of its tip is so rapid that it necessitates the constant watching. Furthermore whenever such a deformation occurs, it must be reformed and this has been causing a considerable inconvenience. Various attempts to develop an electrode alloy capable of substituting for the above-mentioned copper material have been made in order to overcome the drawbacks. However since these various alloys are far inferior to pure copper or the like in thermo-conductivity and electric resistance (though superior in hardness), it is the present status of the resistance welding that in spite of the above-mentioned drawbacks, the pure copper electrode or low copper alloy electrode is still being used.

It is, accordingly, an object of the present invention to provide an electrode for resistance welding which overcomes the above-mentioned drawbacks. It is another object of the present invention to provide a method for producing such an electrode. These objects and other advantages can be attained by the electrode of and the method of the present inventions.

The electrode of the present invention consists of a copper base metal shaped in the form of electrode and a layer of copper-zinc alloy formed on the whole surface of the said base metal by diffusion and impregnation, or consists of the same base metal, the same layer of alloy and a further layer of a first metal selected from the group consisting of aluminum, chromium, nickel, titanium, silicon, beryllium, and an alloy of iron with one of the foregoing first metals formed on the outside of the said layer of alloy by diffusion and impregnation. The method of the present invention comprises maintaining a copper base metal shaped in the form of electrode in contact with a metal powder selected from the group consisting of zinc and zinc alloy or the said metal powder and another powder of a first metal selected from the group consisting of aluminum, chromium, nickel, titanium, silicon, beryllium and an alloy of iron with one of the foregoing first metals, heating the system of the said base metal and the said powder at the temperature where diffusion and impregnation of zinc occur and then at the temperature where the diffusion and impregnation of said first metal or alloy of iron occur.

A clear conception of the several features constituting the present electrode may be had by referring to the drawing accompanying and forming a part of this specification.

Figure 2:
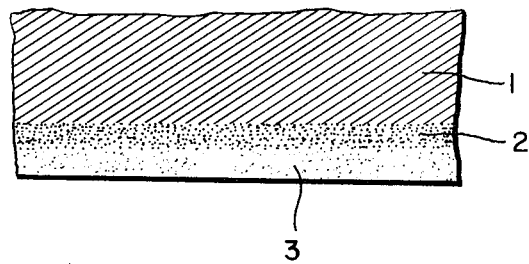

FIG. 1 is an elevation in section of the present electrode and FIG. 2 is an enlarged view of the part A in FIG. 1.

1 is a copper base metal made of copper or a copper alloy and shaped in the same form as in the case of conventional electrode. 2 is a thin copper-zinc alloy layer produced by diffusing and impregnating zinc on the whole surface of the above-mentioned copper base metal, forming a kind of transition layer in which the content of zinc is smaller toward the inside and the content of copper is smaller toward the outside. 3 is a thin outside layer of metal resistant to high voltage or to corrosion formed by diffusing and impregnating a first metal selected from the group consisting of aluminum, chromium, nickel, titanium, silicon, beryllium and an alloy of iron with one of the foregoing first metals. It forms a continuously connected layer upon the copper base metal through an intermediate layer of the alloy layer 2 and from the outside to the inside, the content of zinc or zinc and copper increases and the content of the resistance metal, e.g. aluminum decreases, forming thus a transition layer.

4 is a hole for introducing a cooling water as in the case of conventional electrode for welding.

Thus the present electrode forms one body through a transition alloy layer in which the composition changes continuously from the outside-exposed metal to the inside copper base metal.

Since there is no vacant zone between the covering layer and the copper base metal, the present electrode has the advantage that not only has it no possibility of being peeled-off but also it has excellent heat and electric conductivity. In other words since the above-mentioned alloy layer is formed by diffusion and impregnation, its alloy layer can be made in an extremely thin layer, and also the sudden change of heat and electric conductivity at the transition layer can be avoided because of the continuous change of the Cu—Zn transition layer to the copper base metal.

Since the present electrode is formed by diffusing and impregnating zinc, possessing an excellent alloy-forming property, into copper and further diffusing and impregnating another metal possessing an excellent abrasion- or corrosion-resistance into the resultant layer of copper-zinc alloy, it is also an advantage that even the metal possessing a bad alloy-forming property with copper such as titanium can be readily used. Accordingly the present electrode has an advantage that its surface hardness, heat resistance and corrosion resistance can be remarkably improved by selecting a metal suitable to attain a certain desirable resistance and employing the medium of zinc.

Further the alloy-layer which does not peel-off, forms a transition layer for the other resistant metal in the present electrode, the present electrode undergoes a few abrasions and deformations and can be used until the alloy layer vanishes on account of abrasion and the copper base becomes unusable. Accordingly, it is another advantage of the present electrode that the duration is prolonged by the time elapsing until the alloy layer vanishes compared with conventional electrode and this, together with the increased hardness of the alloy layer, brings about a notably prolonged life time.

Furthermore since the alloy layer of the present electrode is formed by the diffusion and impregnation, the present electrode can be produced at a very cheap cost and in a mass production manner with a guarantee in the uniformity of product.

As for the production method of the present electrode, the powder of metal selected, depending upon the kind of resistance desired, from among the group consisting of aluminum, chromium, nickel, titanium, beryllium, an alloy of iron and one of the foregoing metals is mixed with zinc powder or blue powder for example, zinc powder which may be in the supernatant form at the time of refining and further one or more than one kind of refractory material such as alumina, magnesia, magnesite, olivine sand, silica sand or the like is mixed in order to prevent sintering.

To the resultant mixture of 30 to 60% by weight of metal powder and 40 to 70% by weight of refractory material, one of more than one suitable reaction promoter such as ammonium halide is added in an amount less than 5% by weight. One portion of the foregoing metals such as aluminum, chromium, nickel, titanium, beryllium or the like can be substituted by their salt.

The mixture of powder thus formed is charged to a reaction vessel made e.g. of iron and a copper base metal having an electrode is buried in the powder after washed with an acid and dried.

After closing the vessel, it is heated at a suitable temperature and for a suitable time for zinc to react. On completion of the diffusion and impregnation of zinc, it is further heated at a suitable temperature for suitable time for zinc and another metal to react.

The copper base metal is cooled after another metal diffuses and impregnates into the zinc-copper alloy layer.

As shown in the specific Example 2, the above-mentioned vessel after preheated at 150° C. to 200° C. for the purpose, is charged to a heating furnace and usually heated at 380° C. to 520° C. for one to four hours and then at 600° C. to 950° C. for two to six hours. It is also possible to heat the vessel directly to the temperature of zinc reaction without preheating.

The above-mentioned heating furnace can naturally be heated at the stationary state but it is preferable to afford the vessel a revolution in an extent of 30-60 turns per hour in order to improve the uniformity of the treated product.

Though the above explanation is directed to the case where the copper is buried in a reaction powder usually placed in a vessel, it is also possible to paint the powder mixture on the surface of the copper base and to insert it in a vessel as indicated in Example 3.

The kind of reaction promoter, the amount of refractory material, and the temperature of treatment are determined depending upon the kind of metal to be diffused and impregnated into the zinc-copper alloy layer and the thickness of the alloy layer. The thickness of the alloy layer can be varied by changing the composition of the reaction powder mixture but in the point of better thermo- and electric-conductivity, the thickness ranging from 0.6 to 1.8 m./m. (mm.) is preferable.

In other words when the thickness of the alloy layer is selected in the above-mentioned range, it is possible to maintain the thermo-conductivity of the electrode at a value more than 80% of pure copper and the electric-conductivity at a value of 80% of pure copper and yet to attain almost the same efficiency as in the case of pure copper in the practical use. The present invention may be more fully understood from the following examples which are offered by way of illustration and not by way of limitation. Parts by weight are used throughout.

EXAMPLE 1

A sample of pure copper electrode was washed with an aqueous solution of 10% HCl at a temperature of 40° C., then with warm water and dried. A reaction mixture consisting of

| | Parts |
|---|---|
| Blue powder (zinc powder) | 100 |
| Aluminum powder | 75 |
| Ferrochrom powder | 50 |
| Alumina powder | 100 |
| Magnesia powder | 25 | was used together with a reaction promotor consisting of

| | |
|---|---|
| Ammonium fluoride | 1.5 |
| Aluminum fluoride | 1.5 |

After preheating at 200° C., the reaction vessel was heated at 480° C. for 2 hours and at 850° C. for 4 hours, while the vessel containing the reaction mixture was afforded a revolving of 50 turns per hour. As a result, an electrode having a thickness of an alloy layer of 1.8 m./m. and a composition of 20% Zn, 11% Al, 3% Cr and a remainder of Cu was obtained.

Electric conductivity—55% IACS (layer)
Thermo-conductivity—68% (layer)
Hardness:
    RB 95 (layer) at normal temp.
    RB 80 (layer) at 300° C.

EXAMPLE 2

A sample of pure copper electrode was subjected to the same pretreatment as in Example 1.

A reaction mixture consisting of

| | Parts |
|---|---|
| Zinc powder | 100 |
| Ferroaluminum powder | 80 |
| Nickel powder | 40 |
| Ammonium chloride | 1.0 |
| Nickel chloride | 10 |
| Magnesite | 100 | was made by water and water glass into a paste form and painted on the sample which was then dried. A reaction packing refractory material of

| | Parts |
|---|---|
| Alumina | 100 |
| Magnesia | 20 | was used.

After preheating at 150° C., the vessel was heated at 380° C. for 3 hours and at 900° C. for 2 hours. During the reaction time, the reaction vessel was at the standstill state in the furnace. As a result, an electrode having a thickness of alloy layer of 2 m./m. and a composition of 25% Zn, 15% Al, 8% Ni, and a control of Cu obtained.

Electric conductivity—65% IACS (layer)
Thermo-conductivity—70% (layer)
Hardness:
    RB 27 (base); at normal temp.
    RB 100 (layer) and at 300° C.
    RB 80 (layer)

EXAMPLE 3

A sample of electrode consisting of 0.6% by weight Cr and copper was subjected to the same pretreatment as in Example 1.

A reaction mixture consisting of

| | Parts |
|---|---|
| Blue powder | 100 |
| Alumina | 200 |
| Ferroaluminum | 100 | and a certain promotor consisting of

| | |
|---|---|
| Ammonium chloride | 0.5 |
| Aluminum fluoride | 1.5 | were used.

The reaction vessel was heated for 2 hours after the temperature thereof had been elevated to 400° C. and then maintained at 640° C. for 3 hours. The vessel was afforded a revolution of 40 turns per hour. As a result, an electrode having 2 m./m. thickness of alloy layer and a composition of 30% Zn, 26% Al and a control of Cu was obtained.

Electric conductivity—35% IACS (layer), 85% IACS (base)
Thermo-conductivity—60% (layer), 85% (base)
Hardness:
    RB 70 (base), RB 140 (layer) at normal temp.
    RB 100 (layer) at 300° C.

EXAMPLE 4

A sample of pure copper electrode was subjected to the same pre-treatment as in Example 1. A reaction mixture consisting of

| | Parts |
|---|---|
| Blue powder | 100 |
| Ferrotitanium powder | 60 |
| Nickel chloride | 10 |
| Alumina | 100 |
| Olivine sand | 50 |
| Silicious sand | 80 | and a reaction promotor of 1.5 parts of ammonium chloride were used.

After preheated at 200° C., the reaction vessel was heated at 520° C. for 1.5 hours and then at 750° C., for 3 hours during which time, a revolution of 30 turns per hour was afforded. As a result, an electrode having a thickness of 1.5 m./m. of alloy layer and composition of 25%, Zn, 6% Ti, 1% Ni and a control of Cu was obtained.

Electric conductivity—30% IACS (layer)
Thermo-conductivity—70% (layer)
Hardness:
    RB 27 (base),
    135 (layer) at normal,
    RB 98 (layer) at 300° C.

The same kinds of experiments were carried out in Example 5 to Example 15 as summarized in the following Table 1.

TABLE 1

Note: IACS means the electric conductivity, and abbreviation of International Annealed Copper Standard.
    RB means the hardness, and an abbreviation of of Rockwell B-scale.

EXAMPLE 5

Sample material—0.5% Be-Cu

| Composition of powder mixture: | Parts |
|---|---|
| Blue powder | 100 |
| Fe-Cr powder | 100 |
| Fe-Ni powder | 100 |
| Alumina(Al$_2$O$_3$) | 300 |
| Ammonium chloride | 2 |

Heating:
    Preheating—None
    First step heating—3 hours at 460° C.
    Second step heating—2 hours at 850° C. No revolution of vessel.
Results:
    Alloy layer—0.6 m./m.
    Layer composition—30% Zn, 4% Cr, 2% Ni, Re.Cu (Re: control)
    Electric conductivity—25% IACS (layer), 55% IACS (base)
    Thermo-conductivity—30% (layer), 65% (base)
Hardness:
    RB 65 (base), RB 182 (layer) at normal temp.
    RB 128 (layer) at 300° C.

EXAMPLE 6

Sample material—0.6% Cr-Cu

| Composition of powder mixture: | Parts |
|---|---|
| Zinc powder | 80 |
| Titanium powder | 80 |
| Olivine sand | 400 |
| Ammonium iodide | 2 |
| Alumina(Al$_2$O$_3$) | 100 |

Heating:
    Preheating—None
    First step heating—3 hours at 500° C.
    Second step heating—4 hours at 800° C. No revolution of vessel.
Results:
    Alloy layer—0.6 m./m.
    Layer composition—26% Zn, 2% Ti, Re.Cu
    Electric conductivity—30% IACS (layer), 85% IACS (base)
    Thermo-conductivity—60% (layer), 85% (base)
Hardness:
    RB 48 (base),
    RB 145 (layer) at normal temp.
    RB 85 (layer) at 300° C.

EXAMPLE 7

Sample material—0.6% Cr-Cu

| Composition of powder mixture: | Parts |
|---|---|
| Blue powder | 100 |
| Chromium powder | 30 |
| Fe-Si powder | 100 |
| Alumina(Al$_2$O$_3$) | 100 |
| Olivine sand | 100 |
| Silica sand | 100 |
| Ammonium iodide | 2.5 |

Heating:
    Preheating—200° C.
    First step heating—3 hours at 470° C.
    Second step heating—6 hours at 820° C. No revolution of vessel.

Results:
    Alloy layer—1.8 m./m.
    Layer composition—30% Zn, 3% Cr, 8% Si, Re.Cu
    Electric conductivity—30% IACS (layer), 85% IACS (base)
    Thermo-conductivity—45% (layer), 90% (base)
    Hardness:
        RB 28 (base), RB 160 (layer) at normal temp.
        RB 130 (layer) at 300° C.

EXAMPLE 8

Sample material—Copper

| Composition of powder mixture: | Parts |
|---|---|
| Zinc powder | 100 |
| Aluminum powder | 30 |
| Silicon powder | 10 |
| Ammonium chloride | 2 |
| Alumina (Al$_2$O$_3$) | 100 |
| Olivine sand | 250 |
| SiCl$_4$ | 10 |

Heating:
    Preheating—170° C.
    First step heating—4 hours at 300° C.
    Second step heating—3 hours at 800° C. No revolution of vessel.

Results:
    Alloy layer—1.5 m./m.
    Layer composition—15% Zn, 10% Al, 5% Si, Re.Cu
    Electric conductivity—45% IACS (layer)
    Thermo-conductivity—65% (layer)
    Hardness:
        RB 126 (layer), at normal temp.
        RB 85 (layer) at 300° C.

EXAMPLE 9

Sample material—0.6% Cr-Cu

| Composition of powder mixture: | Parts |
|---|---|
| Zinc powder | 100 |
| NiCl$_2$ | 40 |
| SiCl$_4$ | 30 |
| Magnesite | 20 |
| MgCo$_3$ | 200 |
| NH$_4$Cl | 3 |
| Alumina | 100 |

The powder mixture was kneaded with water and water glass and the resultant paste was painted on the surface of the sample, and the sample is dried by air. The sample was inserted in a vessel.

Heating:
    Preheating—180° C.
    1st and 2nd step heating—7 hours at 480° C. Revolution of vessel: 50 times/hour.

Results:
    Alloy layer—0.7 m./m.
    Layer composition—28% Zn, 5% Ni, 3% Si, Re.Cu
    Electric conductivity—49% IACS (layer), 85% IACS (base)
    Thermo-conductivity—70% (layer) 90% (base)
    Hardness:
        RB 70 (base) RB 175 (layer) at normal temp.
        RB 100 (layer) at 300° C.

EXAMPLE 10

Sample material—0.5% Be-Cu

| Composition of powder mixture: | Parts |
|---|---|
| Blue powder | 100 |
| Fe-Si powder | 100 |
| Alumina (Al$_2$O$_3$) | 50 |
| Olivine sand | 350 |
| NH$_4$Cl | 2.5 |

Heating:
    Preheating—180° C.
    First step heating—4 hours at 480° C.
    Second step heating—3 hours at 820° C. Revolution of vessel: 45 times/hour.

Results:
    Alloy layer—0.7 m./m.
    Layer composition—35% Zn, 8% Si, Re.Cu
    Electric conductivity—25% IACS (layer) 70% IACS (base)
    Thermo-conductivity—30% (layer) 65% (base)
    Hardness:
        RB 90 (base) RB 215 (layer) at normal temp.
        RB 130 (layer) at 300° C.

EXAMPLE 11

Sample material—Copper

| Composition of powder mixture: | Parts |
|---|---|
| Zn powder | 100 |
| Cr powder | 50 |
| Ti powder | 30 |
| Al$_2$O$_3$ | 100 |
| Olivine sand | 100 |
| NH$_4$F | 3 |

Heating:
    Preheating—None.
    First step heating—3 hours at 500° C.
    Second step heating—2 hours at 900° C. Revolution of vessel: 30 times/hour.

Results:
    Alloy layer—1.6 m./m.
    Layer composition—18% Zn, 3% Cr, 1% Ni, Re.Cu.
    Electric conductivity—60% IACS (layer).
    Thermo-conductivity—75% (layer).
    Hardness:
        RB 190 (layer) at normal temp.
        RB 120 (layer) at 300° C.

EXAMPLE 12

Sample material—0.6% Cr-Cu

| Composition of powder mixture: | Parts |
|---|---|
| Blue powder | 100 |
| Ti powder | 50 |
| Si powder | 40 |
| NH$_4$F | 2 |
| Alumina | 100 |
| Olivine sand | 200 |
| Magnesia | 10 |

Heating:
    Preheating—None.
    First step heating—4 hours at 500° C.
    Second step heating—3 hours at 600° C. No revolution of vessel.

Results:
    Alloy layer—0.6 m./m.
    Layer composition—30% Zn, 2% Ti, 0.5% Si, Re.Cu.
    Electric conductivity—58% IACS (layer), 85% IACS (base).
    Thermo-conductivity—76% (layer), 90% (base).
    Hardness:
        RB 60 (base), RB 165 (layer) at normal temp.
        RB 120 (layer) at 300° C.

EXAMPLE 13

Sample material—Copper

| Composition of powder mixture: | Parts |
|---|---|
| Blue powder | 100 |
| Al powder | 100 |
| Fe-Ti powder | 80 |
| Alumina (Al$_2$O$_3$) | 100 |
| Olivine sand | 100 |
| Ammonium bromide | 2.5 |

Heating:
　Preheating—None.
　First step heating—3 hours at 400° C.
　Second step heating—3 hours at 850° C. Revolution of vessel: 50 times/hour.
Results:
　Alloy layer—0.9 m./m.
　Layer composition—29% Zn, 16% Al, 4% Ti, Re. Cu.
　Electric conductivity—34% IACS (layer).
　Thermo-conductivity—40% (layer).
　Hardness:
　　RB 26 (base), RB 134 (layer) at normal temp.
　　RB 90 (layer) at 300° C.

EXAMPLE 14

Sample material—0.6% Cr-Cu

| Composition of powder mixture: | Parts |
|---|---|
| Zn powder | 100 |
| Ni powder | 85 |
| Ammonium chloride | 1.5 |
| MgO | 55 |
| Silica sand | 150 |

Heating:
　Preheating—None.
　First step heating—4 hours at 380° C.
　Second step heating—5 hours at 600° C. Revolution of vessel: 30 times/hour.
Results:
　Alloy layer—0.8 m./m.
　Layer composition—31% Zn, 2.8% Ni, Re.Cu.
　Electric conductivity—35% IACS (layer), 80% IACS (base).
　Thermo-conductivity—45% (layer), 85% (base).
　Hardness:
　　RB 55 (base), RB 110 (layer) at normal temp.
　　RB 90 (layer) at 300° C.

EXAMPLE 15

Sample material—Copper

| Composition of powder mixture: | Parts |
|---|---|
| Blue powder | 100 |
| Cr powder | 60 |
| Ammonium bromide | 1.5 |
| Alumina | 150 |
| Olivine sand | 200 |

Heating:
　Preheating—150° C.
　First step heating—3 hours at 400° C.
　Second step heating—5 hours at 750° C. Revolution of vessel: 35 times/hour.
Results:
　Alloy layer—1.6 m./m.
　Layer composition—34% Zn, 7% Cr, Re.Cu.
　Electric conductivity—42% IACS (layer).
　Thermo-conductivity—58% (layer).
　Hardness:
　　RB 30 (base), RB 110 (layer) at normal temp.
　　RB 86 (layer) at 300° C.

The electrode obtained in each example had more than 80% of thermo-conductivity, more than 80% of electric-conductivity and more than 5–6 times of duration time compared with the values of pure copper electrode. When a nitrogen-containing chemical is used as a reaction promotor in the treatment of diffusion and impregnation, the alloy layer becomes nitride by which the hardness of this layer is elevated.

What is claimed is:

1. An electrode for resistance welding comprising a base metal shaped in the form of an electrode, and a layer of copper-zinc alloy diffused and impregnated in said base metal, said layer comprising an outer surface covering said electrode.

2. An electrode for resistance welding comprising a copper base metal shaped in the form of an electrode, a first layer of copper-zinc alloy diffused and impregnated in the entire outer surface of said base metal, and a further layer of a metal mixture having a first portion selected from the group consisting of Al, Cr, Ni, Ti, Si, Be, and a second portion consisting of one of the foregoing metals of said group alloyed with iron, said metal mixture being diffused and impregnated in the outer surface of said layer of copper-zinc alloy.

3. A method for producing an electrode for resistance welding comprising the steps of: maintaining a copper base metal in contact with a powder mixture comprising metallic zinc powder and a powder of a second kind of metal selected from the group consisting of Al, Cr, Ni, Ti, Si, and an additional metal powder comprising an alloy of iron with one of said second kinds of metals selected from said foregoing group; and heating the system of copper base metal and the powder mixture at a first-step temperature and for a first-step time duration to diffuse and impregnate the zinc into the copper base metal, thereby forming a zinc-copper alloy layer on said base metal; and heating said system at a second-step temperature and for a second-step time duration to diffuse and impregnate the second kind of metal into the zinc-copper alloy layer.

4. A method for producing an electrode for resistance welding which comprises the steps of: maintaining a copper base metal in contact with a first metal powder comprising zinc, and a second metal powder mixed with said first metal powder and selected from the group consisting of Al, Cr, Ni, Ti, Si, and a third metal powder mixed with said first and said second metal powder and comprising an alloy of at least one of the foregoing group metals with iron, and at least one refractory material selected from the group consisting of alumina, magnesia, magnesite, olivine sand and silicious sand, and ammonium halide as a reaction promoter; heating the system of copper base metal and the powder mixture consisting of 30–60% by weight of metal powder, 40–70% by weight of refractory material and less than 0.5% by weight of ammonium halide at a first-step temperature and for a first-step time duration to diffuse and impregnate the zinc into the copper base metal to form an alloy layer of zinc and copper; and then heating said system at a second-step temperature and for a second-step time duration to diffuse and impregnate said second metal powder into the alloy layer of zinc and copper.

5. A method according to claim 4 wherein the system of copper base metal and the powder mixture is in an arrangement where the powder mixture is made into the paste form and painted on the surface of the copper base metal.

6. A method according to claim 4 wherein the system of copper base metal and the powder mixture is in an arrangement where the said copper base metal is buried in the powder mixture placed in a vessel.

7. A method according to claim 6 wherein the vessel is revolved together with the powder mixture relative to the copper base metal during the heating time.

8. A method for producing an electrode for resistance welding which comprises the steps of: maintaining a copper base metal in contact with, a first metal powder comprising zinc, a second metal powder mixed with said first metal powder and comprising a second kind of metal selected from the group consisting of Al, Cr, Ni, Ti, Si, and third metal powder mixed with said first and second metal powders and comprising an alloy of at least one of the said second kind of metals with iron, and a halide salt of a metal selected from the group consisting of Al, Ni, Si, mixed with said first and said second and said third metal powders and acting as a substitute for a portion of said first, second, and third metal powders, at least one refractory material selected from the group consisting of alumina, magnesia, magnesite, olivine sand and silicious sand, and ammonium halide as a reaction promoter; heating the system of copper base metal and the powder mixture consisting of 30–60% by weight of metal powder, 40–70% by weight of refractory material and less than 0.5% by weight of ammonium halide at a first-step temperature and for a first-step time duration to diffuse and impregnate the zinc into the copper base metal to form an alloy layer of zinc and copper; and then heating said system at a second-step temperature and for a second-step time duration to diffuse and impregnate the second kind of metal into the alloy layer of zinc and copper.

References Cited

UNITED STATES PATENTS

| | | | |
|---|---|---|---|
| 1,155,974 | 10/1915 | Aller | 29—199 X |
| 1,957,214 | 5/1934 | Horstkotte | 29—199 X |
| 2,214,002 | 9/1940 | Trainer et al. | 29—196.3 X |
| 2,387,903 | 10/1945 | Hensel | 29—199 X |
| 2,872,564 | 2/1959 | Fresne et al. | 29—196.3 X |
| 3,061,463 | 10/1962 | Samuel | 117—107.2 |
| 3,120,447 | 2/1964 | Buckle | 117—107.2 |

ALFRED L. LEAVITT, Primary Examiner

T. E. BOKAN, Assistant Examiner

U.S. Cl. X.R.

29—199; 117—71, 107.2, 204, 205, 207